May 5, 1931.     C. C. STETSON     1,803,366
SIGNAL ROCKET
Filed Aug. 30, 1929
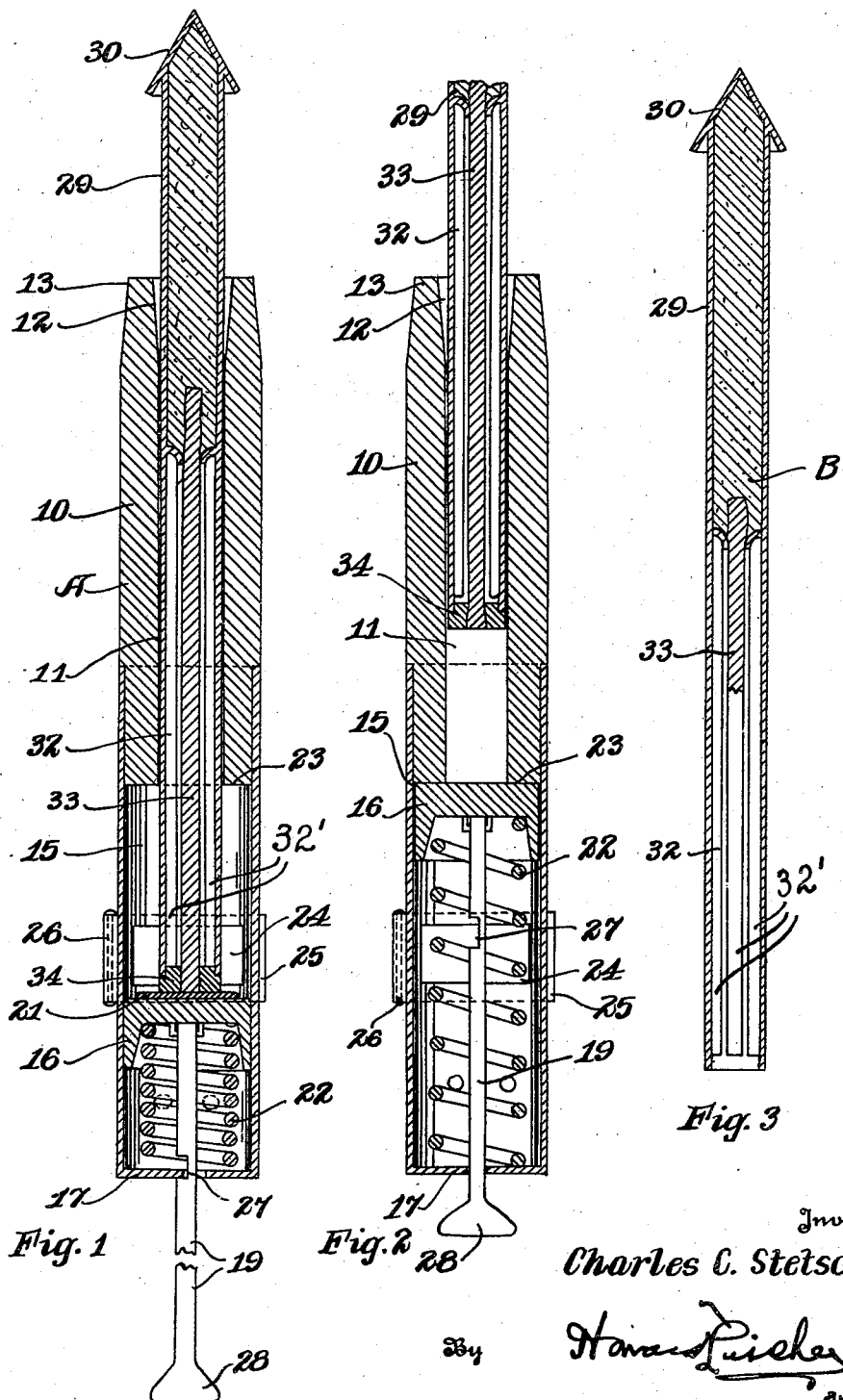
Inventor
Charles C. Stetson
By Howard Pilcher
Attorney Patented May 5, 1931

1,803,366

UNITED STATES PATENT OFFICE

CHARLES C. STETSON, OF ST. PAUL, MINNESOTA

SIGNAL ROCKET

Application filed August 30, 1929. Serial No. 389,427.

My invention relates to an improvement in signal rockets and projecting means, wherein it is desired to provide a rocket which will fly high into the air and form a display which may be seen for a great distance.

The object of my invention is to provide a signal rocket or flare which is easily directed and fired even under adverse weather conditions. As the holder from which it is fired is held by the hand, the direction in which it is fired is easily regulated. The holder may be loaded for firing in a sheltered spot, or may be kept loaded at all times until needed. After having been loaded, the holder is practically watertight, or at least sufficiently so that it may be taken out into a storm and fired. Thus, my rockets are very practical for use on ships and the like as distress signals.

It is my purpose to project the rocket into the air by means of my holder, so that when the powder of the rocket starts to expel sparks, it will already be high in the air. Thus, the rocket action begins far above the surface of the ground or water, propelling the rocket still higher to a height formerly unattainable with the ordinary type rocket and providing a bright light visible for a much greater distance than a common rocket may be seen.

I use the expansive action of a coil spring to start the upward movement of the rocket and to explode immediately under the rocket thus started, a percussion cap to accelerate the rocket movement. The coil spring when released forces a piston bearing the percussion cap and the lower end of the rocket resting upon the cap, rapidly upward, the rocket sliding through the guiding barrel or tube of the holder and the cap impacting and exploding when it strikes the circumferential shoulder at the lower end of said guiding tube. This spring action starts the rocket in motion, and the force of the piston striking the cap against the shoulder explodes the percussion cap, adding to the speed of the rocket as it leaves the holder on its upward journey.

It is also my purpose to have the flash of the cap explosion also automatically ignite a slow match or fuse connected with the powder of the rocket, so that as the rocket is started upon its flight, the fuse is ignited, and burns slowly. When the rocket is high in the air, the fuse ignites the powder, and the rocket action of the sputtering powder blown out through the bottom of the tube projects the rocket still higher into the air, providing a bright signal light.

Further objects and novel features of my invention will be more clearly brought forth in the course of the following specification and claims:

In the drawings forming part of this specification,

Figure 1 is a longitudinal cross section of my rocket and holder in position to be fired.

Figure 2 is another longitudinal cross section of my rocket and holder as the rocket, a portion of which is broken away, is leaving the barrel.

Figure 3 is a longitudinal cross section of my rocket, most of the slow match or fuse portion having been burned away.

My rocket holder A is formed with a cylindrical body portion 10 of such a diameter that it may be easily grasped by the hand. This body portion 10 is drilled out longitudinally to form a barrel 11 into which the rocket B is to be inserted. To allow the rocket B to be easily inserted into the barrel 11, the upper end of the barrel is tapered outwardly slightly at 12 to form a funnel-like barrel opening. To add to the appearance of the holder and prevent any hold-back vacuum or other retard, the body portion 10 is tapered inwardly at its upper end 13, as is illustrated in Figures 1 and 2.

Attached to, and depending from the body portion 10 is a tubular portion 15. This tubular portion 15 is adapted to act as a holder and guiding cylinder for the plunger piston 16. The tubular chamber 15 is closed at its lower end 17 but has several holes to admit air and avoid a partial vacuum when the device is fired. The bottom 17 of the tube 15 is formed with a hole through which the rod 19 extends and by means of a suitable notch 27 formed in the side of the rod 19, the rod or stem 19 may be drawn down and locked with the spring 22 compressed. The plunger 16 and the rod 19 are released by a slight side movement of the rod 19 to disengage the notch 27 from the bottom 17.

A coil spring 22 is positioned, slightly under compression at all times between the lower portion of the piston 16 and the closed end 17 of the chamber 15, so that the piston is normally held against the circumferential shoulder 23 formed by the end of the body portion 10. The piston fits loosely enough within the tubular chamber portion 15 so that it may move freely with little friction or rubbing, the skirt of the piston serving the double purpose of guiding the piston within the walls of the chamber 15 and of enclosing the end of the coil spring 22, acting to hold the spring in place.

To allow the percussion caps 21 to be placed on the top of the piston 16, and to permit the scraping or clearing of the upper surface of the piston 16 to remove the accumulation of fired percussion caps which may form there, I provide an opening 24 covered by a door 25 which may be hingedly connected at 26 as is illustrated in the drawings, or which may slide open and shut. This opening is sufficiently large to admit the percussion cap 21 to be inserted slightly above the surface of the piston and dropped down flatly upon it, said cap being of larger diameter than the guiding barrel so that it is sure to strike the shoulder 23 and explode.

A knob 28 allows the stem 19 to be pulled downwardly against the compression of the coil spring 22 until the piston 16 is in cocked position, in which position the notch 27 comes adjacent to the end 17 of the chamber 15 and the stem is easily moved towards the notched side 27, thus engaging the end 17 and holding the piston down under spring compression.

The rocket or projectile B is formed of a tubular member 29, having a pointed end 30 and an attached skirt 32 serving as a guiding member of the same diameter as the head 29. This skirt 32 also transmits the push or impulse from the spring and from the exploding cap 21 and has slots or openings 32' in its sides as shown. The upper portion of the tube 29 is adapted to contain rocket powder of the ordinary type used in such projectiles. A fuse 33 or slow match extends into this powder and down through the skirt 32 and push block 34 attached thereto. This block 34 has a hole to accommodate the end of the fuse 33 which is held therein within the end of the tubular skirt 32 in such a way that it will not move out of place by the force of the explosion of the cap and at the same time will transmit the said force to the skirt 11 of the rocket. The end block 34 and the end of the fuse 33 are coated with match sulphur or other quick lighting substance to readily ignite when the percussion cap 21 is exploded.

When it is desired to fire the device the operator grasps the guiding barrel 10 with one hand and with the other pulls down the piston 16 by means of the knob 28 upon the lower end of the stem 19, thereby strongly compressing the spring 22. The stem 19 is then locked, the notch 27 engaging the end 17 of the chamber 15 when the firing device is in cocked position. The door 25 is then opened and a percussion cap 21 of sufficient size and strength is inserted in the opening 24 and dropped upon the upper surface of the piston 16 and the door closed. The rocket B is then placed in the barrel 11, the end of the rocket resting upon the percussion cap 21. The device is aimed, the stem 19 is then moved so that the notch 27 is out of engagement with the end 17 and the knob 28 released. The coil spring 22 throws the piston 16 bearing the cap 21 and rocket B upwardly, forces the cap 21 against the shoulder 23, and explodes the cap 21. The rocket, continuing upwardly, is accelerated by the explosion, leaves the barrel, and shoots into the air, its fuse burning, to ignite the rocket material and force itself still higher in the air.

I have provided a device which is very simple in structure, easily operated, and which does not require the use of matches or punk. My rocket is not ineffective in high wind or rain, and is not affected by water spray if it is loaded in a sheltered place. My rocket is very effective as a signal as it may be seen from a greater distance than an ordinary rocket. The light from the rocket is mainly all in evidence only when the rocket is high in the air, utilizing all of the powder of the rocket at a time when it may be seen from a distance.

I have described the principles of operation of my rocket and its firing device, and while I have endeavored to illustrate the best embodiment thereof, I desire to have it understood that obvious changes may be made within the scope of the following claims without departing from the spirit of the invention.

I claim:—

1. A signalling device including a rocket, a holder for said rocket, spring urged rocket ejecting means in said holder, and a percussion cap exploded by said spring urged means to aid the rocket ejection.

2. A signalling device having a flare rocket adapted to be projected into the air, and means for forcing said rocket high in the air, said means including a percussion cap and a spring urged plunger adapted to ignite said percussion cap, the explosion of said cap simultaneously igniting said rocket.

3. A signalling rocket including, a depending skirt, a holder for said rocket and skirt, fuse means extending through said skirt and percussion cap means adapted to be exploded adjacent said skirt and fuse to force said rocket out of said holder.

4. A signalling device, having a firing mechanism including a holder, a recess in said holder adapted to receive a signal rocket, a plunger, spring means for urging said plunger in one direction, an operating rod for said plunger, locking means for holding said plunger in set position with said spring means compressed, said locking means being released by moving said plunger rod slightly transversely whereupon said plunger is adapted to strike the lower end of the rocket and propel it rapidly out of said holder, and means for simultaneously igniting said rocket.

5. A firing device for a signalling rocket comprising, a tubular holder and guiding barrel for the rocket, an ejecting plunger in said barrel, resilient means for operating said plunger, a catch for holding said plunger in a manner to compress said resilient means, said plunger acting against the bottom of the rocket when said catch is released to rapidly expel the rocket from the holder and means for simultaneously igniting said rocket.

6. A hand operated firing device for signal rockets including, a tubular holder, a recess in said holder for receiving the rocket in a manner to permit the same to slide freely therein, a plunger communicating with said recess, resilient means for urging said plunger, a catch for holding said plunger locked in position to compress said resilient means, said plunger acting as a hammer when released to automatically discharge the rocket out of said holder and means to simultaneously ignite the rocket.

7. A signalling rocket including, a hand supporting member having a tubular nature, a signal rocket having an illuminating powder in one end thereof, a fuse supporting tube extending from the other end thereof, means for holding a fuse in said tube, longitudinal openings in said fuse supporting tube, an ejecting and firing plunger within said holder, means for causing said plunger to push against said projecting sleeve on said signal and a firing cap associated with said plunger adapted to ignite said fuse of said signal when said plunger is released to eject said signal.

8. A signal rocket including, a tubular member, illuminating powder in said tubular member, longitudinal recesses formed along one end of said member, oppositely disposed to the location of the illuminating powder, a fuse extending from said illuminating powder to the lower end of said rocket and a rocket supporting and firing means including a member adapted to push against the end of said rocket and to explode a cap in the pushing operation to ignite said fuse in said rocket.

9. A flare signal including, a rocket member having illuminating powder therein, a fuse in said signal, means for supporting said fuse extending from said powder in said signal to the lower end thereof, said fuse supporting means including a tubular member having longitudinal openings therein, and a signal projector comprising means for pushing the signal into the air and to simultaneously ignite the fuse thereof.

10. A signalling device including, a signal rocket having illuminating powder therein, a sleeve extending from the illuminating powder portion of said signal having longitudinal openings therein, a fuse disposed within said tubular portion extending from the illuminating powder to the lower end of said signal, a tubular support for slidably holding said signal within said support, a plunger in the lower end of said support, spring means for urging said plunger in one direction, a catch for locking said plunger against said spring to compress said spring, said signal being adapted to follow against said plunger in the retraction of the same, an ignition cap positioned between said signal and said plunger and means for releasing said catch causing said plunger to eject said signal with a forceful push and simultaneously igniting said ignition cap upon said plunger reaching its limit of travel in said holder.

11. A signalling device including, a rocket signal member having illuminating means therein, adapted to be ignited by a fuse, a long tubular fuse protecting support projecting from the illuminating means in said signal and means for projecting said signal high in the air, said means including a holder in which said signal is adapted to freely slide and an ejecting plunger means adapted to push said signal out of said holder and to simultaneously ignite the fuse in said support therefor.

12. A signal including, a signalling rocket having illuminating means within the same, a fuse extending from said illuminating means adapted to ignite said illuminating means in said rocket, a slotted tubular support for said fuse adapted to hold the igniting end of said fuse remote from the illuminating means of said rocket and projecting means for said rocket including a pusher to push the rocket rapidly into the air and a percussion cap interposed between the end of the rocket and the ejecting means whereby the signalling rocket is ignited as it is ejected from the holder.

13. A signal rocket and ejector including, a tubular supporting member for said rocket, an ejecting plunger in said supporting member, spring means for urging said plunger, a stop for said plunger in one direction, a catch for holding said plunger in position to compress said resilient means and an ignition cap positioned between said signalling rocket and said plunger, whereby when said catch is released said signal is pushed rapidly out of said holder and said percussion cap is ignited upon said plunger reaching said shoulder thereupon simultaneously igniting said signalling rocket causing the same to be projected farther up into the air by the burning of said rocket to provide an illuminating signal.

14. A signalling rocket including, a long tubular member, illuminating means contained within one end of said member, a series of longitudinal open slots extending in the other end of said member, a fuse extending from said illuminating means in one end of said signal through said portion wherein said longitudinal slots are formed and means for holding the lower end of said fuse so that the fuse may be ignited by percussion cap means when the rocket is projected into the air.

15. A signalling rocket having illuminating powder in one end thereof, open slots formed in the other end thereof, an igniting fuse extending through said portion having said open slots and means for holding the lower end of said fuse in a manner to ignite the same by exploding a percussion cap against said holding means and the end of said fuse.

CHARLES C. STETSON.